United States Patent
Chen et al.

(10) Patent No.: US 10,612,180 B2
(45) Date of Patent: Apr. 7, 2020

(54) METHODS AND APPARATUS FOR MEASURING SENSORLESS BRUSHLESS DC MOTOR LOAD

(71) Applicant: Delta Electronics, Inc., Taoyuan (TW)

(72) Inventors: Chin-Hao Chen, Taoyuan (TW); Cheng-Chung Li, Taoyuan (TW); Sheng-Hua Li, Taoyuan (TW); Yin-Yuan Chen, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 12 days.

(21) Appl. No.: 15/866,316

(22) Filed: Jan. 9, 2018

(65) Prior Publication Data
US 2018/0291549 A1   Oct. 11, 2018

(30) Foreign Application Priority Data
Apr. 10, 2017   (CN) .......................... 2017 1 0229556

(51) Int. Cl.
| | |
|---|---|
| *H02P 6/17* | (2016.01) |
| *D06F 39/00* | (2020.01) |
| *H02P 6/08* | (2016.01) |
| *H02P 6/30* | (2016.01) |
| *D06F 37/30* | (2020.01) |
| *H02P 23/14* | (2006.01) |
| *H02P 6/182* | (2016.01) |
| *D06F 33/02* | (2006.01) |

(52) U.S. Cl.
CPC .......... *D06F 39/003* (2013.01); *D06F 37/306* (2013.01); *H02P 6/085* (2013.01); *H02P 6/17* (2016.02); *H02P 6/182* (2013.01); *H02P 6/30* (2016.02); *H02P 23/14* (2013.01); *D06F 33/02* (2013.01); *D06F 37/304* (2013.01); *D06F 2202/10* (2013.01); *D06F 2202/12* (2013.01)

(58) Field of Classification Search
CPC .... H02P 6/182; H02P 6/20; H02P 6/08; H02P 6/085; H02P 6/17; H02P 1/18
See application file for complete search history.

(56) References Cited

U.S. PATENT DOCUMENTS

| | | | |
|---|---|---|---|
| 5,507,054 A * | 4/1996 | Blauert ................. | D06F 39/003 8/159 |
| 6,842,928 B2 * | 1/2005 | Yang ..................... | D06F 37/304 68/12.04 |

(Continued)

*Primary Examiner* — Thai T Dinh
(74) *Attorney, Agent, or Firm* — Muncy, Geissler, Olds & Lowe, P.C.

(57) ABSTRACT

A method for measuring sensorless brushless-DC motor load, adapted to a home appliance, including: accelerating, through the use of a driving circuit, a BLDC motor from an initial rotational speed to a first rotational speed; disabling, through the use of a control circuit, the driving circuit; obtaining, through the use of a detecting circuit, phase voltage information corresponding to each phase of the BLDC motor when the BLDC motor is decelerated from the first rotational speed to a second rotational speed; obtaining, through the use of the control circuit, a first time period during which the BLDC motor decelerates from the first rotational speed to the second rotational speed according to at least one piece of the phase voltage information; obtaining, through the use of the control circuit, a first predicted weight of a load according to the first time period and a first lookup table.

20 Claims, 4 Drawing Sheets

(56) References Cited

U.S. PATENT DOCUMENTS

| | | | | |
|---|---|---|---|---|
| 7,259,533 B2* | 8/2007 | Yang | ............... | H02P 29/02 |
| | | | | 318/433 |
| 8,866,423 B2* | 10/2014 | Suel, II | ............ | H02P 23/009 |
| | | | | 318/163 |
| 8,914,930 B2* | 12/2014 | Chanda | ............ | D06F 33/02 |
| | | | | 68/12.04 |
| 9,093,938 B2* | 7/2015 | Nomura | ............ | F04B 49/06 |
| 9,328,444 B2* | 5/2016 | Lee | ............ | H02P 29/024 |
| 9,840,805 B2* | 12/2017 | Leonard | ............ | D06F 39/003 |
| 2003/0009832 A1* | 1/2003 | Yang | ............ | D06F 37/304 |
| | | | | 8/159 |
| 2004/0183488 A1* | 9/2004 | Fuse | ............ | H02P 6/16 |
| | | | | 318/400.09 |
| 2008/0041115 A1* | 2/2008 | Kanazawa | ............ | D06F 33/02 |
| | | | | 68/12.04 |
| 2008/0258657 A1* | 10/2008 | Ayre | ............ | A61M 1/1086 |
| | | | | 318/400.13 |
| 2010/0037400 A1* | 2/2010 | Koo | ............ | D06F 37/304 |
| | | | | 8/137 |
| 2010/0154131 A1* | 6/2010 | Paul | ............ | D06F 39/003 |
| | | | | 8/159 |
| 2012/0005840 A1* | 1/2012 | Jang | ............ | D06F 33/02 |
| | | | | 8/137 |
| 2014/0271237 A1* | 9/2014 | Kozaki | ............ | F04D 19/042 |
| | | | | 417/45 |

* cited by examiner

METHODS AND APPARATUS FOR MEASURING SENSORLESS BRUSHLESS DC MOTOR LOAD

CROSS REFERENCE TO RELATED APPLICATIONS

This Application claims priority of China Patent Application No. 201710229556.1, filed on Apr. 10, 2017, the entirety of which is incorporated by reference herein.

BACKGROUND OF THE INVENTION

Field of the Invention

The application relates in general to a method and an apparatus for measuring sensorless brushless DC motor load, and in particular to a method and an apparatus for measuring sensorless brushless DC motor load according to phase voltage information of a motor.

Description of the Related Art

These days, methods commonly used in washing machines (such as drum washing machines or upright washing machines) to detect the weight of a load of laundry involve accelerating the motor to a fixed rotational speed, and then detecting the laundry weight within the drum based on the principle of the moment of inertia. That is, in cases where the friction coefficient of the motor's transmission system is fixed, when the motor decelerates from a fixed speed, the deceleration will change depending on the weight of the laundry in the drum, meaning that the weight of the laundry inside the drum can be calculated based on this deceleration.

In the prior art, a change in rotational speed occurs when the motor is freely decelerating, and it is usually measured by counting the number of pulses of the counter-electromotive force of the motor. However, when the number of pulses is counted, an optical coupler is usually needed for transmitting high-voltage signals, and then a comparison amplifier circuit is used for shaping the counter-electromotive force into pulse waves, which can increase the manufacturing cost of the main control board. In addition, because zero-crossing information of the counter-electromotive force can only be extracted in the pulse signals, the accuracy of the laundry weight detection is low.

Therefore, how to simply and accurately measure the weight of a load of laundry without a sensor is a problem that needs to be solved immediately.

BRIEF SUMMARY OF INVENTION

An embodiment of the present invention provides a method for measuring sensorless brushless-DC motor loads, adapted to a home appliance after at least one clothing has been placed in the home appliance, including: accelerating, through the use of a driving circuit, a BLDC motor from an initial rotational speed to a first rotational speed; disabling, through the use of a control circuit, the driving circuit; obtaining, through the use of a detecting circuit, phase voltage information corresponding to each phase of the BLDC motor when the BLDC motor is decelerated from the first rotational speed to a second rotational speed; obtaining, through the use of the control circuit, a first time period during which the BLDC motor decelerates from the first rotational speed to the second rotational speed according to at least one piece of the phase voltage information; obtaining, through the use of the control circuit, a first predicted weight of a load according to the first time period and a first lookup table.

Another embodiment of the present invention provides an apparatus for measuring sensorless brushless DC motor load of a home appliance, including a BLDC motor, a flash memory, a driving circuit, a detecting circuit, and a control circuit. The flash memory includes a first lookup table. The driving circuit is configured for accelerating the BLDC motor from an initial rotational speed to a first rotational speed. The detecting circuit is configured for detecting phase voltage information corresponding to each phase of the BLDC motor. The control circuit is configured for obtaining a first time period during which the BLDC motor decelerates from the first rotational speed to the second rotational speed according to at least one piece of the phase voltage information, and obtaining a first predicted weight of a load according to the first time period and the first lookup table.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Further areas to which the present methods and apparatus for measuring sensorless brushless DC motor load can be applied will become apparent from the detailed description provided herein. It should be understood that the detailed description and specific examples, while indicating exemplary embodiments of methods and apparatus for measuring sensorless brushless DC motor load, are intended for the purposes of illustration only and are not intended to limit the scope of the invention.

Figure 1:
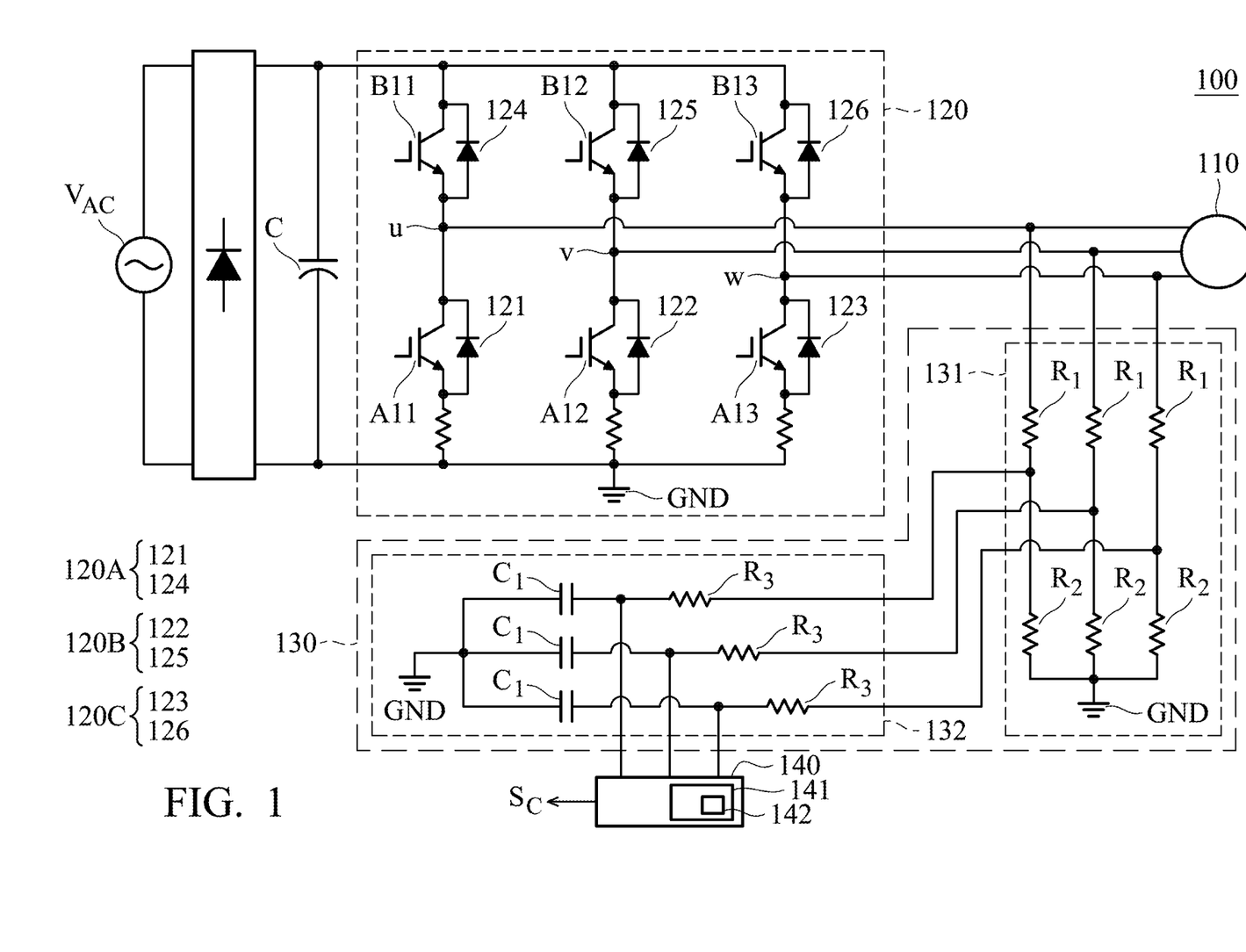
FIG. 1 illustrates a block diagram of the apparatus for measuring the load in accordance with an embodiment of the invention.

FIG. 1 illustrates a block diagram of the apparatus for measuring the load in accordance with an embodiment of the invention. The device 100 is adapted to use in washed home appliances, such as a drum washing machine, an upright washing machine, a clothes dryer/dryer, and the like. The device 100 includes a motor 110, a driving circuit 120, a detecting circuit 130, and a control circuit 140. The motor 110 is a brushless DC (BLDC) motor. The driving circuit 120 is used to drive the motor 110 according to a control signal $S_C$. The detecting circuit 130 is used to detect phase voltage information between a terminal voltage and a ground corresponding to each phase of the motor 110. The control circuit 140 is used to outputs the control signal $S_C$, calculate the rotational speed information based on the phase voltage information, and obtain the predicted laundry weight according to the rotational speed information, a first lookup table, and a second lookup table. The first lookup table and the second lookup table will be pre-built in a flash memory 142 of a microcontroller (MCU) 141 and they are configured to store information of weights and average time, where the MCU 141 is part of the control circuit 140. It should be noted that the device 100 does not include any position sensor.

As shown in FIG. 1, the driving circuit 120 includes a first bridge structure 120A, a second bridge structure 120B, and a third bridge structure 120C. The motor 110 electrically connects to an up bridge switch element 124 and a down bridge switch element 121 of the first bridge structure 120A via a node u, electrically connects to an up bridge switch element 125 and a down bridge switch element 122 of the second bridge structure 120B via a node v, and electrically connects to an up bridge switch element 126 and a down bridge switch element 123 of the third bridge structure 120C via the node w.

The detecting circuit 130 is composed of a bleeder circuit 131 and an RC circuit 132. The control circuit 140 electrically connects to the node u, the node v and the node w through the bleeder circuit 131 and the RC circuit 132 to obtain phase voltage signal $E_{uG}$ between the node u and the ground, phase voltage signal $E_{vG}$ between the node v and the ground, and phase voltage signal $E_{wG}$ between the node w and the ground of the motor 110, respectively.

Figure 2:
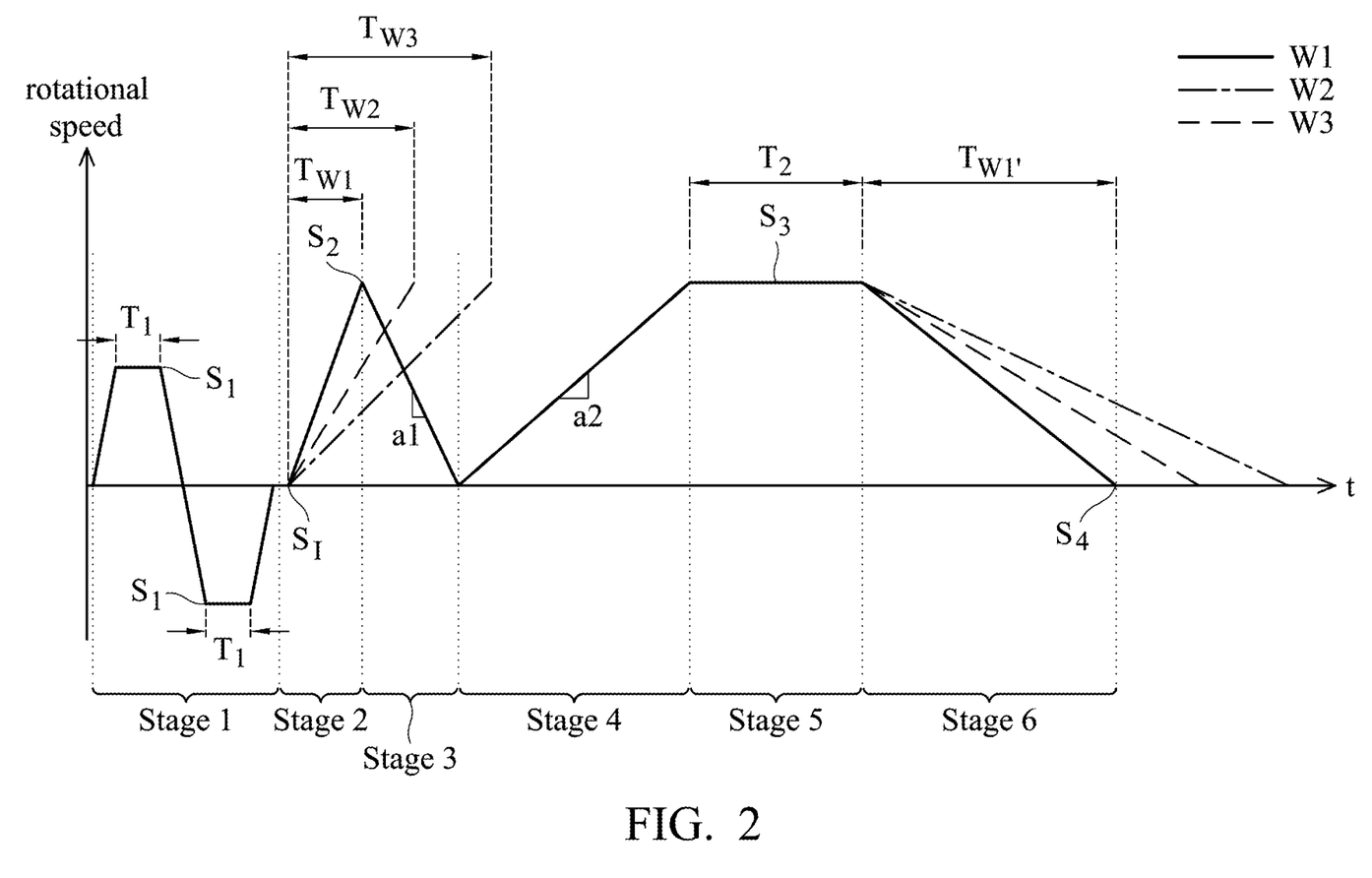
FIG. 2 illustrates a schematic diagram of the different operation stages of the apparatus for measuring the load in accordance with an embodiment of the present invention.

FIG. 2 illustrates a schematic diagram of different operation stages of the apparatus for measuring the load in accordance with an embodiment of the present invention. In the first operation stage (Stage 1), when the user puts the laundry into the drum of the drum washing machine and starts the drum washing machine, for improving an accuracy of the weight measurement, the control circuit 140 outputs the control signal $S_C$ to control the driving circuit 120 to drive the motor 110 for repeatedly rotating the motor 110 forward and reverse to disperse the laundry since the clothes are placed in the lower half of the drum. For example, as shown in FIG. 2, the driving circuit 120 accelerates the motor 110 in clockwise from zero to the first rotational speed $S_1$ (about 600 to 1000 RPM), and maintains the first rotational speed $S_1$ for a predetermined time $T_1$ (e.g., 5 to 10 seconds), and decelerates the motor 110 from the first rotational speed $S_1$ to zero. Then, the driving circuit 120 accelerates the motor 110 from zero to the first rotational speed $S_1$ counterclockwise, maintains the first rotational speed S1 for the predetermined time $T_1$, and decelerates the motor 110 from the first rotational speed $S_1$ to zero to disperse the laundry. It should be noted that, in order to simplify the explanation, in the first operation stage shown in FIG. 2, the motor 110 only performs one set of the forward and reverse rotation, but the number of repetitions of the forward and reverse rotation can be increased according to the demand of the user, and it is not limited thereto.

In the second operation stage (Stage 2), the driving circuit 120 obtains a fixed torque by applying a predetermined q-axis current (e.g., 1 to 5 A), and the motor 110 is accelerated from an initial rotational speed $S_1$ (about 0-500 RPM) to a second rotational speed $S_2$ (about 3000-4000 RPM), and the control circuit 140 measures the time it takes for the motor 110 to accelerate from the initial rotational speed $S_1$ to the second rotational speed $S_2$. In cases where the torque is fixed, since the laundry weight is proportional to the time (as shown in FIG. 2, TW1<TW2<TW3 when W3>W2>W1), a first predict laundry weight can be obtained according to the measured time with reference to a first lookup table. As shown below, Table 1 shows information about the time and the weight of the clothing. For example, when the control circuit 140 measures that the time it takes for the motor 110 to accelerate from the initial rotational speed $S_1$ to the second rotational speed $S_2$ is about 1.9 seconds, the laundry weight can be estimated as 1 kg according to the first lookup table.

TABLE 1

|  | 0 kg | 1 kg | 2 kg | 3 kg |
| --- | --- | --- | --- | --- |
| time | 1.6 s | 1.9 s | 2.2 s | 2.4 s |

In the third operation stage (Stage 3), when the motor 110 is accelerated to the second rotational speed $S_2$, the driving circuit 120 decelerates the motor 110 at an acceleration $a_1$ (e.g., −1000 RPM/sec) from the second rotational speed $S_2$ to the initial rotational speed $S_1$.

In the fourth operation stage (Stage 4), the driving circuit 120 accelerates the motor 110 at a fixed acceleration $a_2$ (e.g., 300 RPM/sec) from the initial rotational speed $S_1$ to the third rotational speed $S_3$ to make the distribution of the laundry more even.

In the fifth operation stage (Stage 5), when the motor 110 is accelerated to the third rotational speed $S_3$, the driving circuit 120 drives the motor 110 to continuously run at the third rotational speed $S_3$ for a second predetermined time $T_2$ (e.g., 5 to 10 seconds), so that the laundry can be affixed to the inside of the drum, and the accuracy of the weight measurement can be improved.

In the sixth operation stage (Stage 6), the control circuit 140 disables the driving circuit 110, so that the motor 110 freely decelerates from the third rotational speed $S_3$. According to an embodiment of the present invention, the detecting circuit 130 obtains the phase voltage signal $E_{uG}$, the phase voltage signal $E_{vG}$ and the phase voltage signal $E_{wG}$ of the motor 110 while the motor 110 is running and calculates counter-electromotive force line voltage using the following equation:

$$E_{uv}=E_{uG}-E_{vG} \quad (1)$$

$$E_{vw}=E_{vG}-E_{wG} \quad (2)$$

$$E_{wu}=E_{wG}-E_{uG} \quad (3)$$

$$|E_{b\text{-}LL}|=0.8165\sqrt{(E_{uv})^2+(E_{vw})^2+(E_{wu})^2} \quad (4)$$

$$|E_{b\text{-}LL}|=K\cdot\text{Motor\_speed} \quad (5)$$

wherein, $E_{uG}$, $E_{vG}$ and $E_{wG}$ are phase voltage signals, $E_{uv}$, $E_{vw}$, $E_{wu}$ are the counter-electromotive force line voltage between each phase, $|E_{b\text{-}LL}|$ is the real-time amplitude of the counter-electromotive force line voltage, Motor_speed is the motor rotational speed, and K is a constant.

Then, the instant rotational speed of the motor 110 can be obtained in accordance with the obtained real-time amplitude of the counter-electromotive force line voltage. Finally, a second predict laundry weight can be calculated according to the time $T_{W1}$ it takes for the motor 110 to freely decelerate from the third rotational speed $S_3$ to the fourth rotational speed $S_4$ with reference to a second lookup table. As shown below, Table 2 shows information about the time $T_{W1}$ and the weight of the clothing. For example, when the control circuit 140 measures that the time it takes for the motor 110 to freely decelerate from the third rotational speed $S_3$ to the fourth rotational speed $S_4$ is about 3.9 seconds, the laundry weight can be estimated as 1 kg according to the second lookup table.

TABLE 2

| | 0 kg | 1 kg | 2 kg | 3 kg |
|---|---|---|---|---|
| time | 3.3 s | 3.9 s | 4.5 s | 4.9 s |

It should be noted that the instantaneous amplitude of the counter-electromotive force line voltage can be obtained according to the phase voltage signal $E_{uG}$, the phase voltage signal $E_{vG}$ and the phase voltage signal $E_{wG}$, and the definition of parameters such as the respective rotational speed, running time, q-axis current, acceleration and deceleration is only used for illustrative purposes, and the settings of the parameters can be adjusted according to the demands of the user.

In addition, according to another embodiment of the present invention, the control circuit 140 further obtains non-real-time voltage information (such as peak information) and zero-crossing information of the counter-electromotive force according to any one or any two of the phase voltage signal $E_{uG}$, the phase voltage signal $E_{vG}$ and the phase voltage signal $E_{wG}$, and obtains the rotational speed of the motor based on the non-real-time voltage information or zero-crossing information, so that the purpose of reducing complexity of design of a main control board can be achieved.

According to an embodiment of the present invention, when the control circuit 140 obtains the first predicted laundry weight and the second predicted weight of the clothing, a final laundry weight can be obtained by calculating an average value of the first predicted weight and the second predicted weight or providing different weights to the first predicted weight and the second predicted weight. In addition, the control circuit 140 may choose the heaviest of the first predicted weight and the second predicted weight as the final laundry weight so as to avoid the shortage of the amount of water supplied by the washing machine due to misjudgment of the weight.

It should be noted that the sequence of the various operation stages shown in FIG. 2 is only for illustrative purposes, and that the sequence of the operation stages can be changed according to the demands of the user. And additional stages can be added or fewer stages can be used between the various stages without departing from the spirit and scope of the present invention.

Figure 3A:
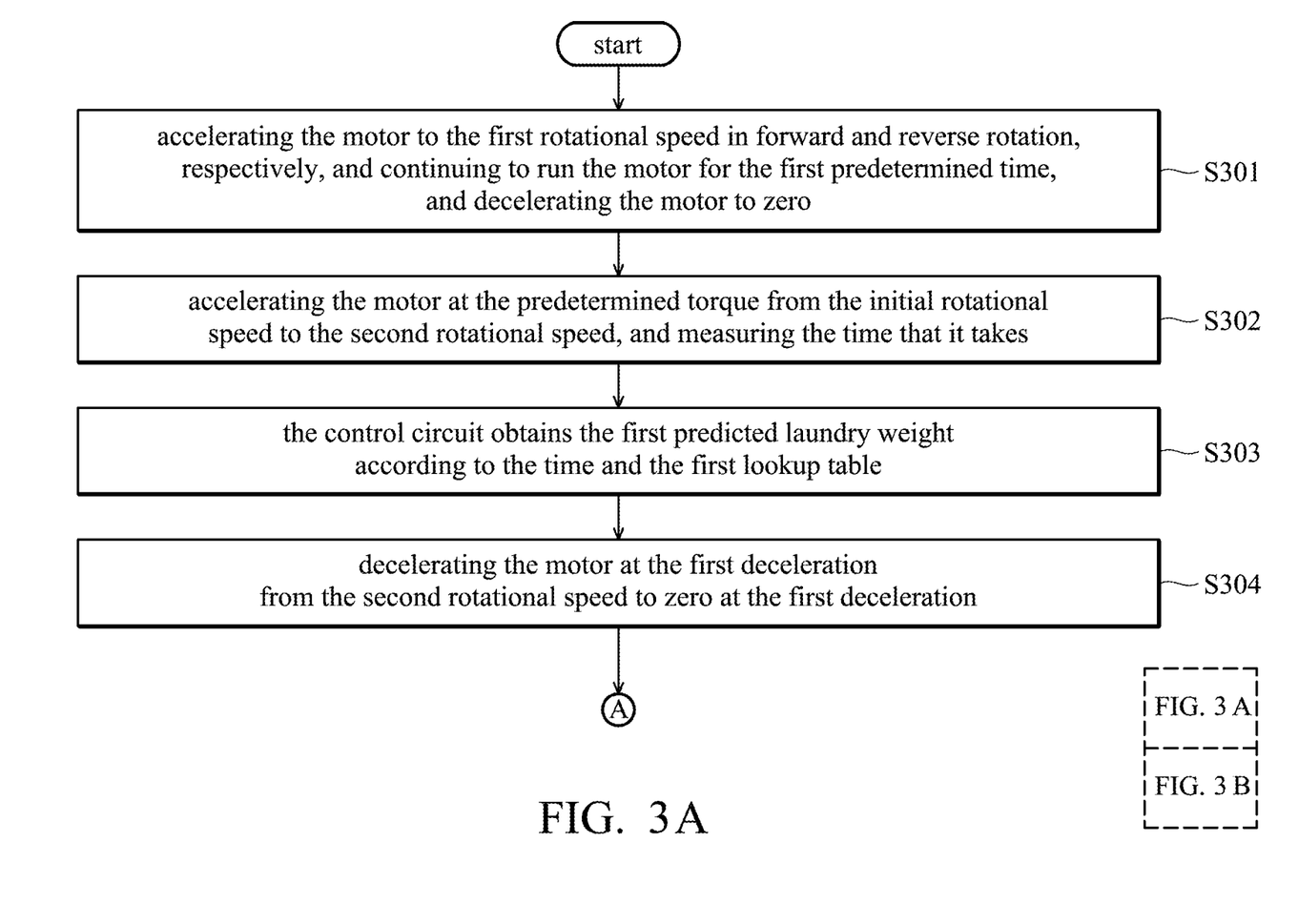
FIGS. 3A, 3B illustrate a flow chart of the method for measuring the load in accordance with an embodiment of the present invention.
Figure 3B:
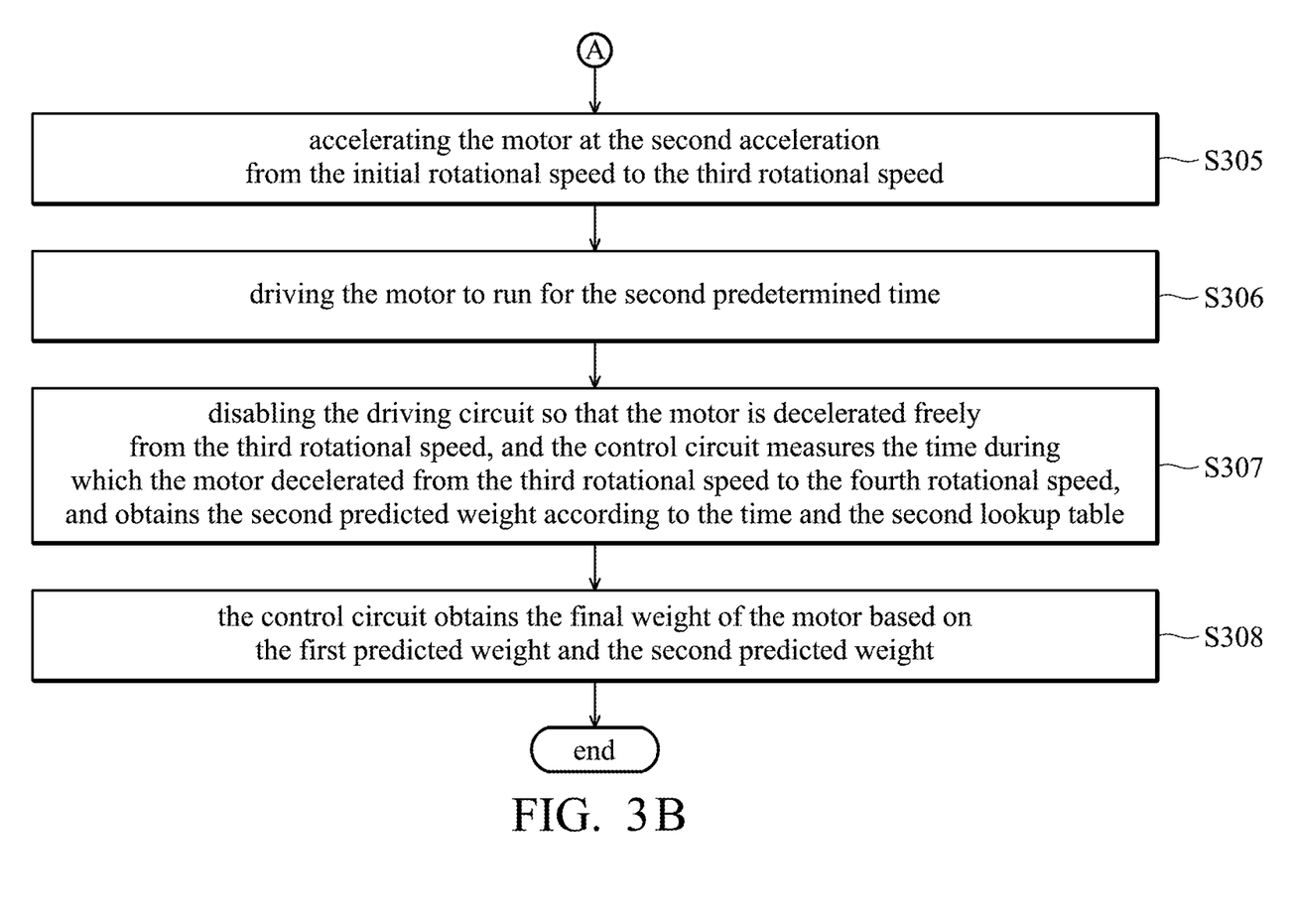

FIGS. 3A, 3B illustrate a flow chart of the method for measuring the load in accordance with an embodiment of the present invention. The exemplary method 300 starts in step S301, the driving circuit 120 accelerates the motor 110 to the first rotational speed S1 in forward and reverse rotation, respectively, and continues to run the motor 110 for the first predetermined time $T_1$, and decelerates the motor 110 to zero. In step S302, the control circuit 140 controls the driving circuit 120 to accelerate the motor 110 at the predetermined torque from the initial rotational speed $S_1$ to the second rotational speed $S_2$, and to measure the time $T_{W1}$ that it takes for the motor 110 to accelerate from the initial rotational speed $S_1$ to the second rotational speed $S_2$. In step S303, the control circuit 140 obtains the first predicted laundry weight according to the time $T_{W1}$ and the first lookup table. Next, the method proceeds to step S304, the control circuit 140 controls the driving circuit 120 to decelerate the motor 110 at the first deceleration $a_1$ from the second rotational speed S2 to zero at the first deceleration a1. In step S305, the control circuit 140 controls the driving circuit 120 to accelerate the motor 110 at the second acceleration $a_2$ from the initial rotational speed $S_1$ to the third rotational speed $S_3$. In step S306, the driving circuit 140 drives the motor 110 to run for the second predetermined time $T_2$ at the third rotational speed $S_3$. In step S307, the control circuit 140 disables the driving circuit 110 so that the motor 110 is decelerated freely from the third rotational speed $S_3$. During the deceleration of the motor 110, the control circuit 140 calculates the rotational speed of the motor 110 based on the phase voltage signal $E_{uG}$, the phase voltage signal $E_{vG}$, and the phase voltage signal $E_{wG}$ obtained by the detecting circuit 130, respectively, measures the time $T_{W1}$ during which the motor 110 decelerated from the third rotational speed $S_3$ to the fourth rotational speed $S_4$, and obtains the second predicted weight according to the time $T_{W1}$ and the second lookup table. Finally, the method proceeds to step S308, the control circuit 140 obtains the final weight of the motor 110 based on the first predicted weight and the second predicted weight.

It is noted that the sequence of the steps in the exemplary method 300 is only for illustrative purposes, and the sequence of the steps can be changed according to the demands of the user. Additional steps can be added or fewer steps can be used without departing from the spirit and scope of the present invention.

As described above, the present invention provides an apparatus and a method for measuring sensorless brushless DC motor load, the real-time amplitude of the counter-electromotive force line voltage of the motor can be obtained by detecting the phase voltage information of each phase at the time when the motor is freely decelerated, the real-time rotational speed information of the motor can be calculated according to the real-time amplitude, and the laundry weight is obtained based on the time during the instantaneous speed change of the motor. Compared with the conventional technique, the real-time rotational speed information obtained by the present invention has a better rotational speed resolution since the conventional technique usually obtains the rotational speed information based only on the zero-crossing information of the counter-electromotive force, and thereby a more accurate laundry weight prediction can be obtained. Also, the complexity of the circuit design of the main control board circuit can be reduced, thereby reducing the cost of the main control board.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:

1. A method for measuring sensorless brushless-DC motor load, adapted to a home appliance after at least one clothing has been placed in the home appliance, comprising:

accelerating, through the use of a driving circuit, a BLDC motor from an initial rotational speed to a first rotational speed;

disabling, through the use of a control circuit, the driving circuit;

obtaining, through the use of a detecting circuit, phase voltage information corresponding to each phase of the BLDC motor when the BLDC motor is decelerated from the first rotational speed to a second rotational speed;

obtaining, through the use of the control circuit, a first time period during which the BLDC motor decelerates from the first rotational speed to the second rotational speed according to at least one piece of the phase voltage information;

obtaining, through the use of the control circuit, a first predicted weight of a load according to the first time period and a first lookup table;

accelerating, through the use of the driving circuit, the BLDC motor at a predetermined torque from the initial rotational speed to a third rotational speed;

measuring, through the use of the control circuit, an acceleration time period during which the BLDC brush motor accelerates from the initial rotational speed to the third rotational speed; and obtaining, through the use of the control circuit, a second predicted weight of the load according to the acceleration time period and a second lookup table.

2. The method as claimed in claim 1, further comprising:
calculating, through the use of the control circuit, counter-electromotive force information corresponding to the BLDC motor according to the phase voltage information;

obtaining, through the use of the control circuit, rotational speed information of the BLDC motor according to the counter-electromotive force information, and;

obtaining, through the use of the control circuit, the first time period according to the rotational speed information.

3. The method as claimed in claim 2, further comprising:
accelerating, through the use of the driving circuit, the BLDC motor at a first acceleration from the initial rotational speed to the first rotational speed.

4. The method as claimed in claim 3, further comprising:
running, through the use of the driving circuit, the BLDC motor at the first rotational speed for a first predetermined time continuously, and decelerating the BLDC motor from the first rotational speed to the second rotational speed.

5. The method as claimed in claim 4, further comprising:
decelerating, through the use of the driving circuit, the BLDC motor at a second deceleration from the third rotational speed to zero.

6. The method as claimed in claim 5, further comprising:
averaging, through the use of the control circuit, the first predicted weight and the second predicted weight to obtain a final weight.

7. The method as claimed in claim 5, further comprising:
choosing as a final weight, through the use of the control circuit, the heaviest of the first predicted weight and the second predicted weight.

8. The method as claimed in claim 5, further comprising:
accelerating, through the use of the driving circuit, the BLDC motor from zero to a fourth rotational speed;

running, through the use of the driving circuit, the BLDC motor for a second predetermined time continuously;

decelerating, through the use of the driving circuit, the BLDC motor from the fourth rotational speed to zero;

accelerating, through the use of the driving circuit, the BLDC motor from zero to the fourth rotational speed in an opposite direction;

running, through the use of the driving circuit, the BLDC motor for the second predetermined time continuously; and decelerating, through the use of the driving circuit, the BLDC motor from the fourth rotational speed to zero.

9. The method as claimed in claim 1, further comprising:
accelerating, through the use of the driving circuit, the BLDC motor at a first acceleration from the initial rotational speed to the first rotational speed.

10. The method as claimed in claim 1, further comprising:
running, through the use of the driving circuit, the BLDC motor at the first rotational speed for a first predetermined time continuously, and decelerating the BLDC from the first rotational speed to the second rotational speed.

11. The method as claimed in claim 10, further comprising:
averaging, through the use of the control circuit, the first predicted weight and the second predicted weight to obtain a final weight.

12. The method as claimed in claim 10, further comprising:
choosing as a final weight, through the use of the control circuit, the heaviest of the first predicted weight and the second predicted weight.

13. The method as claimed in claim 1, wherein the first lookup table and the second lookup table are stored in a flash memory of a microcontroller of the control circuit, and the first lookup table and the second lookup table comprising information of weights and average time.

14. An apparatus for measuring sensorless brushless DC motor load of a home appliance, comprising:
a BLDC motor;
a flash memory, including a first lookup table and a second lookup table;
a driving circuit, configured for accelerating the BLDC motor from an initial rotational speed to a first rotational speed;
a detecting circuit, configured for detecting phase voltage information corresponding to each phase of the BLDC motor after disabling the driving circuit; and
a control circuit, configured for obtaining a first time period during which the BLDC motor decelerates from the first rotational speed to a second rotational speed according to at least one piece of the phase voltage information, and obtaining a first predicted weight of a load according to the first time period and the first lookup table, wherein
the driving circuit is further configured for accelerating the BLDC motor at a predetermined torque from the initial rotational speed to a third rotational speed,
the control circuit is further configured for measuring an acceleration time period during which the BLDC motor accelerates from the initial rotational speed to the third rotational speed and obtains a second predicted weight of the load according to the acceleration time period and the second lookup table; and
the control circuit is further configured for calculating counter-electromotive force information corresponding to the BLDC motor according to the phase voltage information, obtaining the rotational speed information of the BLDC motor according to the counter-electromotive force information, and obtaining the first time period according to the rotational speed information.

15. The apparatus as claimed in claim 14, wherein:
the driving circuit is further configured for accelerating the BLDC motor at a first acceleration from the initial rotational speed to the first rotational speed, continuously runs the BLDC motor at the first rotational speed for a first predetermined time, and decelerating the BLDC motor from the first rotational speed to the second rotational speed; and the control circuit is further configured for calculating counter-electromotive force information corresponding to the BLDC motor according to the phase voltage information, obtaining rotational speed information of the BLDC motor according to the counter-electromotive force information, and obtaining the first time period according to the rotational speed information.

16. The apparatus as claimed in claim 15, wherein the driving circuit further configured for decelerating the BLDC motor at a second deceleration from the third rotational speed to zero.

17. The apparatus as claimed in claim 16, wherein the control circuit is further configured for averaging the first predicted weight and the second predicted weight to obtain a final weight.

18. The apparatus as claimed in claim 16, wherein the control circuit is further configured for choosing the heaviest of the first predicted weight and the second predicted weight as a final weight.

19. The apparatus as claimed in claim 16, wherein the driving circuit is further configured for accelerating the BLDC motor from zero to a fourth rotational speed, continuously running the BLDC motor for a second predetermined time, decelerating the BLDC motor from the fourth rotational speed to zero, accelerating the BLDC motor from zero to the fourth rotational speed in an opposite direction, continuously running the BLDC motor for the second predetermined time, and decelerating the BLDC motor from the fourth rotational speed to zero.

20. The apparatus as claimed in claim 14, wherein:

the flash memory is provided in a microcontroller; and the first lookup table and the second lookup table comprise information of weights and average time.

* * * * *